United States Patent [19]
Grieshaber et al.

[11] Patent Number: 5,121,734
[45] Date of Patent: Jun. 16, 1992

[54] INTERNAL COMBUSTION ENGINE

[75] Inventors: Hermann Grieshaber, Aichtel-Aich; Wilhelm Polach, Möglingen, both of Fed. Rep. of Germany

[73] Assignee: Robert Bosch GmbH, Stuttgart, Fed. Rep. of Germany

[21] Appl. No.: 663,929

[22] PCT Filed: Jul. 28, 1990

[86] PCT No.: PCT/DE90/00586
§ 371 Date: Mar. 26, 1991
§ 102(e) Date: Mar. 26, 1991

[87] PCT Pub. No.: WO91/03634
PCT Pub. Date: Mar. 21, 1991

[30] Foreign Application Priority Data

Sep. 11, 1989 [DE] Fed. Rep. of Germany ....... 3930243

[51] Int. Cl.⁵ .................................................. F02M 25/07
[52] U.S. Cl. ..................................... 123/568; 123/571; 60/275; 60/278; 60/311
[58] Field of Search ................. 123/52 M, 198 F, 315, 123/568, 569, 570, 571; 60/274, 275, 278, 311, 303

[56] References Cited
U.S. PATENT DOCUMENTS

| | | | |
|---|---|---|---|
| 3,446,196 | 5/1969 | Daigh | 123/568 |
| 3,507,260 | 4/1970 | Walker | 123/568 |
| 3,512,509 | 5/1970 | Daigh | 123/568 |
| 4,100,734 | 7/1978 | Ozaki et al. | 123/568 X |
| 4,131,095 | 12/1978 | Ouchi | 123/315 X |
| 4,186,698 | 2/1980 | Aoyama | 123/568 |
| 4,249,382 | 2/1981 | Evans et al. | 123/571 X |
| 4,303,053 | 12/1981 | Etoh et al. | 123/568 |
| 4,475,524 | 10/1984 | Eckert et al. | 123/568 |
| 4,788,819 | 12/1988 | Henkel | 60/275 X |
| 4,969,446 | 11/1990 | Olsson et al. | 123/568 X |

*Primary Examiner*—Willis R. Wolfe
*Attorney, Agent, or Firm*—Edwin E. Greigg; Ronald E. Greigg

[57] ABSTRACT

A multi-cylinder internal combustion engine with an air intake system and an exhaust gas collection system has an exhaust gas recirculation apparatus for reducing toxic emissions. To operate the engine with a turbocharger and charge air cooler, the exhaust gas recirculation apparatus has an exhaust gas distributor, branching off from which is a number of end pipes corresponding to the number of cylinders of the engine. The exahust gas distributor is connected to the exhaust gas pipe of one cylinder, while the exhaust gas pipes of the other cylinders communicate with an exhaust gas manifold. The end pipes of the exhaust gas distributor each discharge into cylinder intake pipes immediately upstream of the inlet valve of the cylinders.

14 Claims, 3 Drawing Sheets

INTERNAL COMBUSTION ENGINE

BACKGROUND OF THE INVENTION

The invention is based on an internal combustion engine, in particular a Diesel engine, of the generic type defined hereinafter.

In a known engine of this type (German Patent Document 30 11 580 A1), an exhaust gas recirculation line is connected to each exhaust pipe leading away from the cylinder, for the purpose of exhaust gas recirculation, and an exhaust gas throttle valve is disposed in the line in order to vary the free cross section of the exhaust gas recirculation line. Downstream of the exhaust gas throttle valve is the exhaust gas manifold, from which branch lines lead to each intake pipe. One passage control device, which is operated synchronously with the engine rpm, is disposed in each branch line. At the point where the branch line discharges into the intake pipe, a guide tube is inserted into the intake pipe and with it forms an annular conduit.

The branch line discharges into the annular conduit. The guide tube ends immediately upstream of the inlet valve. With this kind of exhaust gas recirculation apparatus, the emissions of nitrogen oxide in the exhaust gas are markedly reduced, and the amount of exhaust gas is well mixed with the fuel and air mixture.

In highly supercharged NKW engines, the use of an exhaust gas recirculation apparatus has previously been avoided, since engine wear increases from soiling, the exhaust gas counterpressure under heavy load is lower than the charge pressure of the charge air compressor, and charge air coolers and compressors become dirty, which markedly reduces their efficiency. Adherence to required exhaust gas limit values in terms of nitrogen oxide emissions is attained here by charge air cooling, high supercharging, and very late injection onset by the fuel injection pump. Because of the late injection onset, however, this adherence is achieved at the cost of an increase of about 10 to 20% in fuel consumption.

ADVANTAGES OF THE INVENTION

The engine according to the invention has the advantage that the surface of the exhaust gas recirculation apparatus exposed to the exhaust gas that reaches the air aspirated by the cylinders is comparatively small and thus can be embodied such that it is protected against soiling and corrosion. The charge air cooler and the charge air compressor are not exposed to exhaust gas and thus cannot become soiled. Thus the engine can be designed as an NKW engine without the danger of soiling as a result of the exhaust gas recirculation. Because of the reduction in emissions attained by the exhaust gas recirculation, the onset of injection by the fuel injection pump can re-adjusted to earlier timing, so that by comparison with NKW engines with a very late injection onset, the fuel consumption drops markedly, with equally low nitrogen oxide emissions.

The exhaust gas recirculation is independent of the pressure drop between the exhaust gas pipe and the intake pipe. The removal of exhaust gas to the exhaust gas distributor is always assured. The exhaust gas turbocharger can be designed thermodynamically, or in other words with a higher charge pressure compared with the exhaust gas counterpressure.

The tangential delivery of the exhaust gas to the inlet valve causes pre-storage of the exhaust gas upstream of the inlet valve, even if the exhaust gas occurs in batches. Upon opening of the inlet valve, exhaust gas is aspirated first, and then fresh air with fuel. Mixing takes place in the cylinder. Uniform distribution and good combustion are thus assured.

Advantageous further features of and improvements to the internal combustion engine defined herein are attainable with the characteristics recited hereinafter.

Because of the connection with only one cylinder of the engine, the exhaust gas in the exhaust gas distributor occurs in batches. To attain uniform distribution of the quantities of exhaust gas to all the cylinders, in a further embodiment of the invention the end pipes are on the one hand dimensioned in such a way that an equally large quantity of exhaust gas flows into each intake pipe, and on the other hand the intake pipes are embodied such that the volume between the intake manifold and the inlet valve is approximately 5 to 10 times the maximum delivered quantity of exhaust gas.

Because the exhaust gas distributor is thermally insulated and made of corrosion-resistant material, soiling of the exhaust gas distributor is avoided—except for a slight film of soot.

In a practical embodiment of the invention, an exhaust gas cleaner is disposed between the exhaust gas pipe and the exhaust gas distributor. If an electrostatic soot filter followed by a centrifugal separator is provided, the largely particle-free core flow enters the exhaust distributor, while the particle-laden flow of exhaust gas enters the exhaust gas manifold. As a result, even the slight deposit of soot in the exhaust gas distributor is prevented.

To control the $CO_2$ content in the exhaust gas, which is quite variable depending on engine operating conditions, the quantity of exhaust gas delivered to the exhaust gas distributor is controllable and can even be shut off entirely, in a further embodiment of the invention. One option for varying the exhaust gas recirculation rate is that the injection quantity of the cylinder communicating with the exhaust gas distributor is varied if the $CO_2$ content in the exhaust gas and thus in the cylinder charge becomes too high or too low. At low load and in idling, an exhaust gas rate of approximately 15% is specified. At high load, this proportion is too high and is adapted by reducing the injection quantity. In any case, a power loss of about 5% must be accepted into the bargain. The adaptation of the quantities is effected by suitably triggering the fuel injection pump.

With a cold engine and at low load, the exhaust gas recirculation is suppressed, to avoid smoke and high hydrocarbon emissions.

In one embodiment of the invention, this can be effected by means of a 3/2-way valve, disposed between the exhaust gas pipe and the exhaust gas distributor, which in one switching position connects the exhaust gas pipe to the exhaust gas distributor and in the other connects the exhaust gas pipe to the exhaust gas manifold.

If the engine is operated with a cylinder shutoff means for cold starting and at low load, then in a further embodiment of the invention the suppression of the exhaust gas recirculation is effected in a practical manner by assigning the cylinder communicating with the exhaust gas distributor to the group of cylinders that can be shut off.

In a preferred embodiment of the invention, however a further outlet valve may also be provided in the cylinder communicating with the exhaust gas distributor, the outlet opening of the valve communicating with the exhaust gas manifold via a separate exhaust gas pipe. Both outlet valves can be switched on or off as needed via a hydraulic valve shutoff means of a known type. In this way, at full load or if the engine is to supply a very high torque briefly, the exhaust gas recirculation can be stopped. The exhaust gas recirculation rate can also be controlled with a corresponding control of the valve strokes. In cold operation, the intrinsically necessary shutoff of cylinders can then be dispensed with.

In summary, by means of the exhaust gas recirculation according to the invention in internal combustion engines embodied as NKW engines, the following advantages are attained:
- improvement in fuel consumption with low nitrogen oxide emissions;
- a narrow injection timing adjustor range; and
the capability of designing the exhaust gas turbocharger for a high rated output.

DRAWINGS

The invention is described in further detail below in terms of exemplary embodiments shown in the drawings. Shown in the form of basic sketches are:

FIG. 1, a six-cylinder internal combustion engine with an air intake and exhaust gas system;

FIGS. 2-4, each details of an engine as in FIG. 1, in accordance with further exemplary embodiments.

DESCRIPTION OF THE EXEMPLARY EMBODIMENTS

Figure 1:
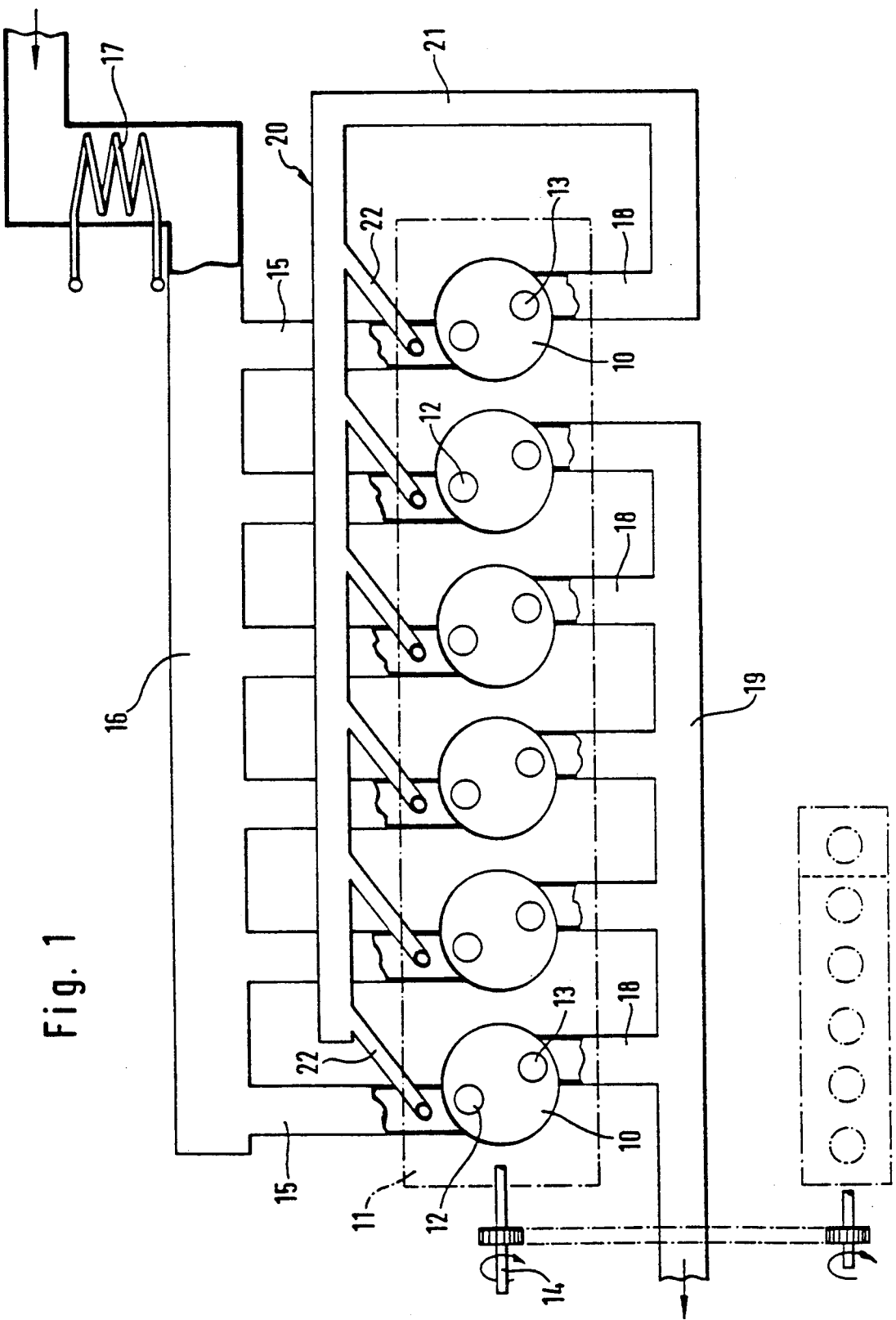

The internal combustion engine sketched only basically in FIG. 1 has six cylinders 10, which are combined in an engine block 11. Each cylinder 10 has one inlet valve 12 and one outlet valve 13. The inlet and outlet valves 12, 13 of the cylinders are controlled via a camshaft suggested at 14. The inlet openings of the inlet valves 12 communicate via intake pipes 15 with an intake manifold 16. The intake manifold 16 is acted upon by a turbocharger or charge air compressor, not shown, and is equipped with a charge air cooler 17. From the outlet opening of each outlet valve 13, an exhaust gas pipe 18 leads to an exhaust gas manifold 19.

To lower the nitrogen oxide emissions, an exhaust gas recirculation apparatus 20 is provided, which has an exhaust gas distributor 21. End pipes 22, each of which leads to one of the cylinders 10 and which correspond in number to the cylinders 10, branch off from the exhaust gas distributor 21. Each end pipe 22 discharges in the intake pipe 15 associated with the cylinder 10 directly upstream of the inlet valve 12, at a tangent to the inlet opening of the inlet valve 12. The exhaust gas pipe 18 of the last cylinder 10 is separated from the exhaust gas manifold 19 and communicates with the inlet of the exhaust distributor 21. The exhaust gas distributor is produced from corrosion-resistant material and is thermally insulated. The end pipes 22 are dimensioned such that an equally large quantity of exhaust gas flows out of the exhaust gas distributor 21 into each intake pipe 15. Since only one cylinder 10 is connected to the exhaust gas distributor 21, the exhaust gas in the exhaust gas distributor 21 occurs in batches. In order nevertheless to distribute it uniformly to all the cylinders 10, the intake pipes 15 are dimensioned such that the volume in the intake pipe 15 present between the inlet valve 12 and the intake manifold 16 is equivalent to approximately 5 to 10 times the quantity of exhaust gas delivered to the intake pipe 15. Through the mouth of the end pipes 22 immediately upstream of the inlet valves 12, the delivered quantity of exhaust gas is pre-stored in the inlet valve 12, even given the batchwise delivery that is not in cycle with the intake stroke. If the valve opens during the intake stroke of the cylinder 10, the exhaust gas quantity is aspirated first, and then fresh air. Mixing takes place in the cylinder 10, thus assuring uniform distribution in the combustion chamber.

The quantity of exhaust gas delivered to the exhaust gas distributor 21 is controllable, and for certain operating conditions of the engine can even be blocked off completely. At low loads and in idling, the exhaust gas recirculation rate is defined at approximately 15% of the exhaust gas quantity. At high load, this proportion is too high. To reduce it, the fuel injection quantity of the sixth cylinder 10, metered by a fuel injection pump, is reduced accordingly, so that the exhaust gas recirculation rate drops to about 10%. However, this entails a power loss of about 5%. The injection quantity that has been changed compared with that of the other five cylinders 10 naturally also leads to a reduced output of torque by the sixth cylinder 10. At high loads, however, this causes no significant problems.

With a cold engine and at low load, the recirculated quantity of exhaust gas is blocked. If the engine has a cylinder shutoff means in any case for this situation, then the blocking of the exhaust gas recirculation quantity can be effected by assigning the sixth cylinder to the group of cylinders that can be shut off. If the engine does not have a cylinder shutoff means of this kind, then the sixth cylinder can also be shut off by blocking fuel injection.

Figure 3:
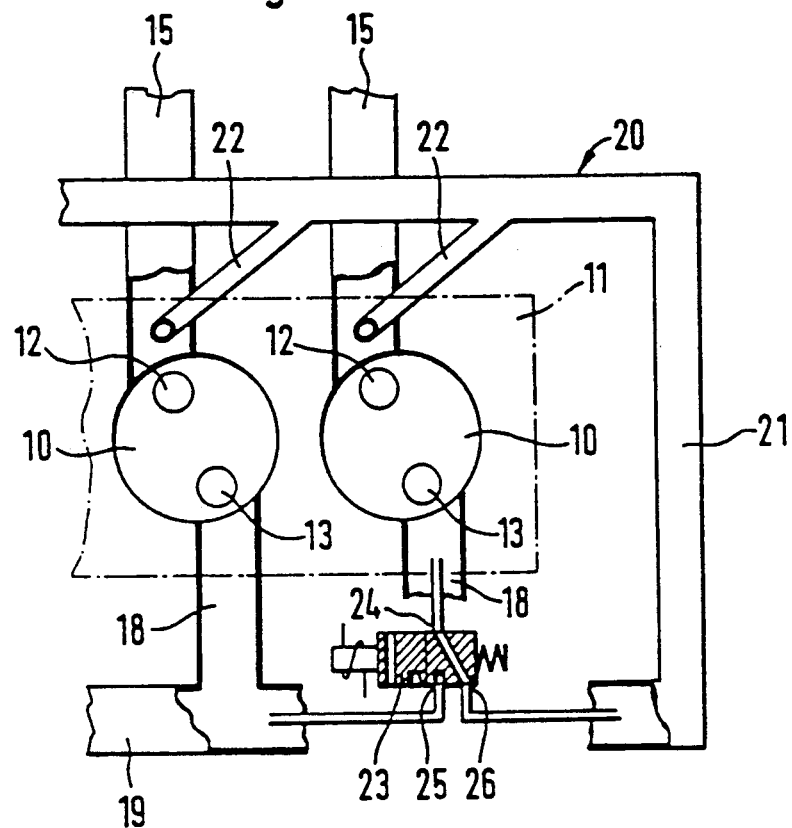

In the further exemplary embodiment of an engine shown in fragmentary form in FIG. 3, a shutoff of the exhaust gas recirculation quantity when the engine is cold and at low load is attained by means of a 3/2-way valve 23. The 3/2-way valve 23, for instance embodied as a magnet valve, has three controlled connections 24-26, of which the connection 24 communicates with the exhaust gas pipe 18 of the sixth cylinder, the connection 25 communicates with the inlet of the exhaust gas distributor 21, and the connection 26 communicates with the exhaust gas manifold 19. Depending on the switching position of the 3/2-way valve 23, the exhaust gas pipe 18 communicates with either the exhaust gas distributor 21 or the exhaust gas manifold 19.

Figure 4:
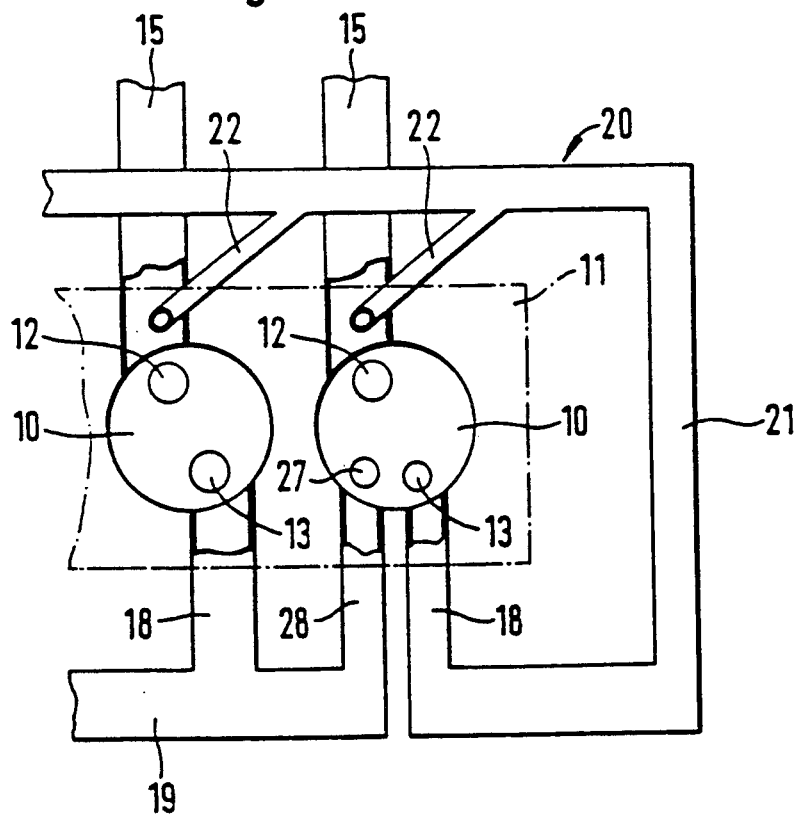

Another option for controlling the exhaust gas recirculation quantity or shutting off exhaust gas recirculation is provided in the engine schematically shown in fragmentary form in FIG. 4. Here, the sixth cylinder 10 is provided with a second outlet valve 27, the outlet opening of which is connected to the exhaust gas manifold 19 via a separate exhaust gas pipe 28. The two outlet valves 13, 27 are switched on or off as needed via a known hydraulic valve shutoff means. As a result, the exhaust gas recirculation can be stopped at full engine load or if the engine is intended to briefly produce a very high torque. The rate of the recirculated exhaust gas quantity can also be controlled with corresponding stroke control of the two outlet valves 13, 14.

Figure 2:
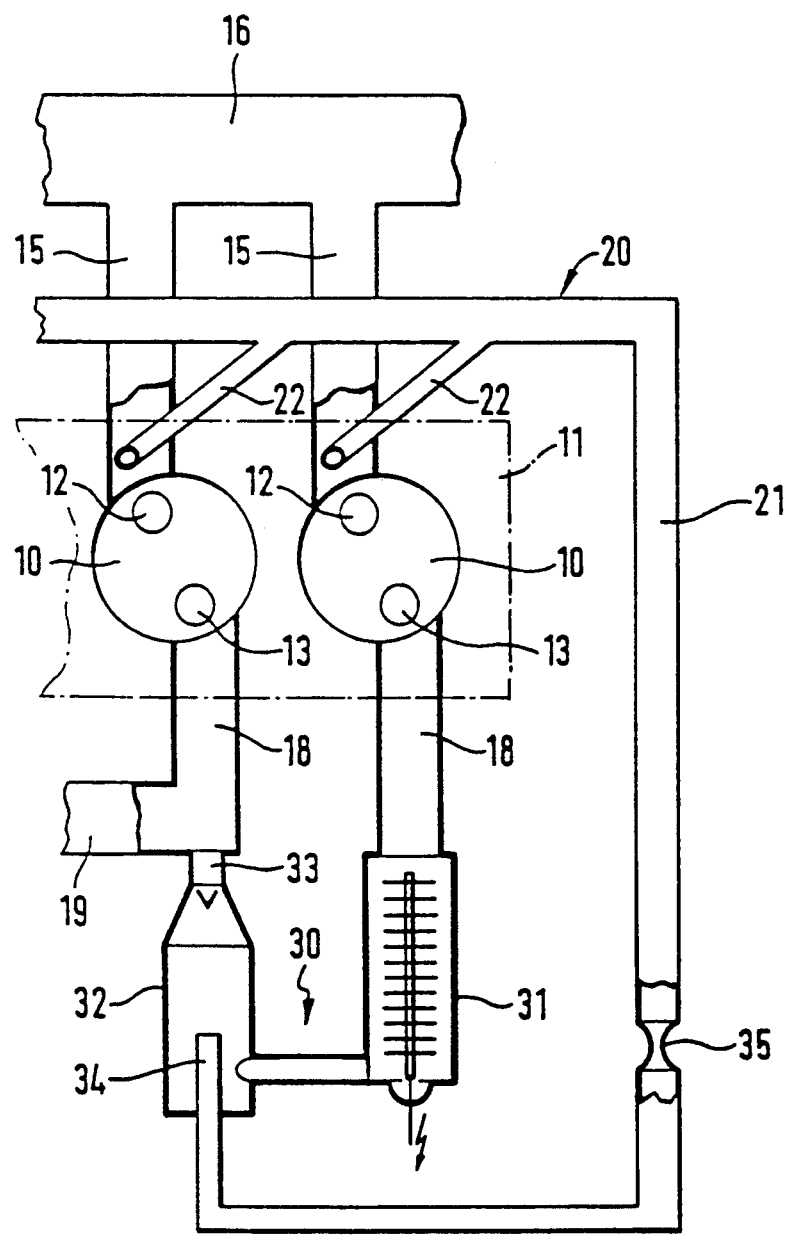

In the engine shown in detail and schematically in FIG. 2, an exhaust gas cleaner 30, in this case embodied as an electrostatic soot filter, is incorporated between the exhaust gas pipe 18 of the sixth cylinder 10, leading to the exhaust gas distributor 21, and the exhaust gas distributor 21 itself. An electrostatic soot filter of this kind is described for instance in German Patent Document 35 02 448 A1. It comprises an electrostatic filter 31 and a following centrifugal separator 32, also known as a cyclone. In the electrostatic filter 31, the particles contained in the exhaust gas coagulate into larger agglomerates, which are then deposited on the walls under the influence of centrifugal force in the centrifugal separator 32 and migrate to an outlet 33. The exhaust gas located in the core of the centrifugal separator 32 flows as a largely particle-free stream of exhaust gas into the exhaust gas distributor 21 via a central immersion pipe 34. The outlet 33 by way of which a partial flow of exhaust gas removes the precipitated-out agglomerates (the stream of dirty gas) communicates with the exhaust gas manifold 19. The pressure relationships necessary for the action of the centrifugal separator 32 are assured by a fixedly adjusted throttle 35, which is disposed in the connection between the immersion pipe 34 and the exhaust gas distributor 21.

The foregoing relates to preferred exemplary embodiments of the invention, it being understood that other variants and embodiments thereof are possible within the spirit and scope of the invention, the latter being defined by the appended claims.

We claim:

1. An internal combustion engine having at least four cylinders each with one inlet valve and at least one outlet valve, an intake manifold and intake pipes leading from said intake manifold to each one of the cylinders, said intake pipes discharge in the region of the inlet openings of the inlet valves, an exhaust gas manifold and exhaust gas pipes leading from said exhaust gas manifold to each one of the cylinders, said exhaust gas pipes begin at the outlet openings of the outlet valves, and an exhaust gas recirculation apparatus to reduce toxic emissions, said exhaust gas recirculation apparatus (20) has an exhaust gas distributor (21), from which a number of end pipes (22) corresponding to the number of cylinders branches off, each end pipe (22) discharges in one of the intake pipes (15) immediately upstream of the inlet valve (12), preferably at a tangent to the inlet opening, and that an exhaust gas pipe (18) of one cylinder (10) is separated from the exhaust gas manifold (19) and connected to the exhaust gas distributor (21), a 3/2 way valve for controlling the quantity of exhaust gas delivered to the exhaust gas distributor (21) said 3/2-way valve (23) including first, second and third controlled connections and disposed between the exhaust gas pipe (18) and the exhaust gas distributor (21), said first connection (24) communicates with the exhaust gas pipe (18), the second connection (25) communicates with the exhaust gas distributor (21) and the third connection (26) communicates with the exhaust gas manifold (19), and that said 3/2-way valve (23) connects the first connection (24) to the second connection (25), in one switching position, and in another switching position connects said first connection to the third connection (26).

2. An engine as defined by claim 1, which includes a second outlet valve (27), said second outlet valve includes an outlet opening which communicates via a second exhaust gas pipe (28) with the exhaust gas manifold (19), said second outlet valve is provided in the cylinder (10) communicating with the exhaust gas distributor (21).

3. An internal combustion engine having at least four cylinders each with one inlet valve and at least one outlet valve, an intake manifold and intake pipes leading from said intake manifold to each one of the cylinders, said intake pipes discharge in the region of the inlet openings of the inlet valves, an exhaust gas manifold and exhaust gas pipes leading from said exhaust gas manifold to each one of the cylinders, said exhaust gas pipes begin at the outlet openings of the outlet valves, and an exhaust gas recirculation apparatus to reduce toxic emissions, said exhaust gas recirculation apparatus (20) has an exhaust gas distributor (21), from which a number of end pipes (22) corresponding to the number of cylinders branches off, each end pipe (22) discharges in one of the intake pipes (15) immediately upstream of the inlet valve (12), at a tangent to the inlet opening, and that an exhaust gas pipe (18) of one cylinder (10) is separated from the exhaust gas manifold (19) and connected to the exhaust gas distributor (21), an exhaust gas cleaner (30) in the form of an electrostatic soot filter is disposed between the exhaust gas pipe (18) and the exhaust gas distributor (21) a first outlet (33) of the exhaust gas cleaner (30), carries a particle-enriched stream of exhaust gas and communicates with the exhaust gas manifold (19), and a second outlet (34) of the exhaust gas cleaner (30), carries a cleaned stream of exhaust gas and communicates with the exhaust gas distributor (21), and that a throttle (35) is disposed between the second outlet (34) and the exhaust gas distributor (31).

4. An engine as defined by claim 3, in which the quantity of exhaust gas delivered to the exhaust gas distributor (21) is controllable.

5. An engine as defined by claim 3, which includes a cylinder shutoff means shutting off a group of cylinders for cold operation, in which the cylinder (10) communicating with the exhaust gas distributor (21) is assigned to the group of cylinders (10) that can be shutoff.

6. An engine as defined by claim 3, in which the exhaust gas distributor (21) is produced from corrosion-resistant material and embodied as thermally insulated.

7. An engine as defined by claim 6, in which the quantity of exhaust gas delivered to the exhaust gas distributor (21) is controllable and/or can be blocked off.

8. An engine as defined by claim 3 in which each intake pipe (15) is embodied such that the pipe volume existing between the intake manifold (16) and the inlet valve (12) is approximately five to ten times the maximum delivered quantity of exhaust gas.

9. An engine as defined by claim 8, in which the exhaust gas distributor (21) is produced from corrosion-resistant material and embodied as thermally insulated.

10. An engine as defined by claim 8, in which the quantity of exhaust gas delivered to the exhaust gas distributor (21) is controllable and/or can be blocked off.

11. An engine as defined by claim 3, in which the end pipes (22) of the exhaust gas distributor (21) are dimensioned such that an equally large quantity of exhaust gas flows into each intake pipe (15).

12. An engine as defined by claim 11 in which each intake pipe (15) is embodied such that the pipe volume existing between the intake manifold (16) and the inlet valve (12) is approximately five to ten times the maximum delivered quantity of exhaust gas.

13. An engine as defined by claim 11, in which the exhaust gas distributor (21) is produced from corrosion-resistant material and embodied as thermally insulated.

14. An engine as defined by claim 11, in which the quantity of exhaust gas delivered to the exhaust gas distributor (21) is controllable and/or can be blocked off.

* * * * *